May 29, 1962   F. REITERER ETAL   3,037,095
RAIL TRACK
Filed April 19, 1955
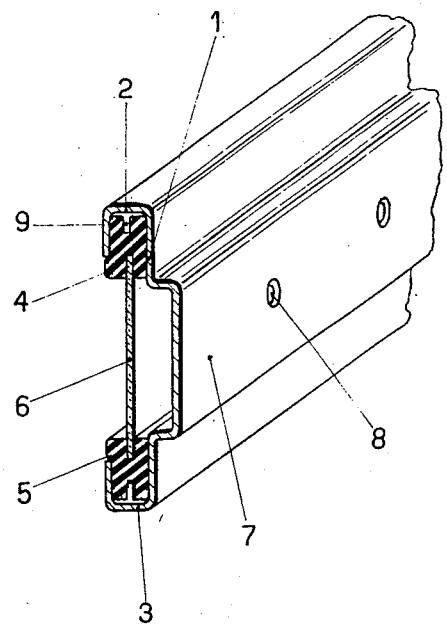
INVENTORS
FERDINAND REITERER
LOUIS WINDISCH
By
ATTORNEY

United States Patent Office 3,037,095
Patented May 29, 1962

3,037,095
RAIL TRACK
Ferdinand Reiterer and Louis Windisch, both of
21 Rue de la Chapelle, Paris, France
Filed Apr. 19, 1955, Ser. No. 502,358
Claims priority, application France Apr. 27, 1954
1 Claim. (Cl. 191—22)

This invention relates to rail tracks and in particular to tracks for carriage-mounted fans, which are movable on said track which is arranged above various machines in a textile mill.

Such installations need, apart from the actual track on which the carriage runs, a conductor rail to provide a constant supply of electric current to the motors which drive the carriage and the fan.

It is an object of the present invention to provide such a track with a built-in conductor rail, which is of a particularly simple and economical construction.

It is a further object of the present invention to provide a rail track having a preferably metal track member an edge of which constitutes a running rail and further having preferably rubber insulating strips located thereon in which the edges of a preferably metal strip are imbedded.

It is another object of the present invention to make the track member channel shaped, the edges of the channel being bent-over constituting the running rail and forming housings in which the insulating strips are located.

According to the invention the rail track comprises a metal track member, one edge of which constitutes a running rail and having insulating strips rigidly located thereon, in which the edges of a conducting metal strip are imbedded.

A specific embodiment of the invention will now be described by way of example with reference to the accompanying drawing.

In the figure, 1 represents a channeled track member which is bent back at its ends, as at 2 and 3, so as to form a housing for two strips of sectional rubber 4 and 5 having slots in which are imbedded the edges of a strip 6 made of metal which is a good conductor, for example aluminium.

The upper horizontal portion 2 of the track member constitutes the actual track for the wheels of a carriage while the conductor strip 6 is wiped by a brush, for example of carbon, mounted on the carriage.

The track member 1 is formed with a dished central portion 7 which projects so as to be spaced from the "live" strip 6. This projecting portion is provided with spaced holes 8 by means of which the track can be fixed to suitable supports, by means of bolts for example.

Fish-plates, joining two rails, are likewise mounted on this portion 7 without risk of their coming into contact with the strip 6. The gap between said strip and the portion 7 of the track member may also be used, if desired as a cable or insulated pipe conduit.

The insulating strips 4 may be provided with slots such as 9 which, as a result of the resilience which they afford, simplify the mounting and retention of the said strips in the bent-over portions 2 and 3 of the fitting.

Other arrangements than that illustrated may be used, without departing from the scope of the invention. For example the track members may have any cross-section. They may, for example, consist of a flat bar to which the rubber strips are fixed by any means known in the art.

The strips of rubber or similar material, need not necessarily be continuous and may be replaced by insulating blocks provided at sufficiently close intervals to ensure that the conductor strip is well held.

The conductor strip may be of any metal, such as aluminium, or copper, which is a good conductor of electricity.

The track according to the invention has considerable advantages over constructions of the type previously known. It is extremely simple to manufacture and may be mass produced in a very economical manner. The track and conductor rail assembly forms a rigid unit, which is easily mounted, the live part of which is well protected against accidental contact by enveloping parts which are earthed.

The assembly does not take up much room and has no projection parts on which the carriage could catch or where dust could accumulate and cause fouling. It ensures great stability in running, is neater and can easily be curved to suit whatever path the carriage has to follow. Finally it is very light which is a not inconsiderable advantage because it has to be supported by uprights above the machine.

While the invention has been described with respect to a particular preferred example which gives satisfactory results, it will be understood by those skilled in the art after understanding the invention, that various changes and modifications may be made without departing from the sprit and scope of the invention and it is intended, therefore, in the appended claim to cover all such changes and modifications.

Having thus described the invention what is claimed as new and desired to be secured by Letters Patent is:

A rolling rail for a carriage travelling thereon and conductive strip assembly comprising an elongated metallic member having a flat intermediate portion and its longitudinal edges bent to form rectangular channel portions, the outer free sides of said channel portions extending toward and terminating short of each other and being in spaced parallel relation with said intermediate flat portion, a pair of resiliently elongated yieldable insulating strip members respectively disposed longitudinally and snugly within said channel portions and extending in spaced parallelism with each other and having elongated longitudinal slots therein in the face opposite each other, a conductive strip extending longitudinally along the space between said channel portions and having its opposite longitudinal edges respectively engaged in said slots to support said strip in spaced insulated relation with respect to the flat intermediate portion of said elongated member.

References Cited in the file of this patent
UNITED STATES PATENTS

| | | |
|---|---|---|
| 945,502 | Enequist | Jan. 4, 1910 |
| 1,068,233 | Fox | July 22, 1913 |
| 1,623,920 | Harris | Apr. 5, 1927 |
| 1,972,283 | Zimmers | Sept. 4, 1934 |
| 2,086,795 | Frank | July 13, 1937 |
| 2,128,995 | Fisher et al. | Sept. 6, 1938 |
| 2,412,382 | Anderson et al. | Dec. 10, 1946 |

FOREIGN PATENTS

| | | |
|---|---|---|
| 475,254 | Canada | July 17, 1951 |